United States Patent [19]
Pund et al.

[11] 3,767,027
[45] Oct. 23, 1973

[54] ADJUSTABLE GUIDE ASSEMBLY FOR FEEDING BOTTLES AND THE LIKE TO A HORIZONTAL MOVING PLATFORM

[75] Inventors: Francis X. Pund; Ralph E. Lippert, both of Cincinnati, Ohio

[73] Assignee: The Andrew Jergens Company, Cincinnati, Ohio

[22] Filed: July 25, 1972

[21] Appl. No.: 274,892

[52] U.S. Cl. ................................................ 198/32
[51] Int. Cl. ............................................ B65g 47/26
[58] Field of Search .................... 198/30, 32, 33 AB

[56] References Cited
UNITED STATES PATENTS
2,744,611   5/1956   Jenney.................................. 198/32

Primary Examiner—Edward A. Sroka
Attorney—Dean S. Edmonds et al.

[57] ABSTRACT

A plurality of vertical dividers is suspended over a moving horizontal platform so as to receive a plurality of rows of oblong articles such as bottles moving on the platform. The dividers are shaped so as to separate the rows as they are carried by the platform and to thereafter turn the separated rows approximately 45 degrees in a horizontal plane so as to discharge the rows of articles at the latter angle onto a second horizontal platform moving in a direction perpendicular to the direction of movement of the first-mentioned platform.

4 Claims, 5 Drawing Figures

ADJUSTABLE GUIDE ASSEMBLY FOR FEEDING BOTTLES AND THE LIKE TO A HORIZONTAL MOVING PLATFORM

This invention relates to guides for rows of moving articles and, more particularly, to a guide assembly for transferring a plurality of rows of upright oblong articles moving in a direction along the larger horizontal dimension of the articles from one horizontal moving platform to a second horizontal platform moving in a direction perpendicular to the direction of the first-mentioned platform.

In the handling of large quantities of articles such as bottles so as to convey them automatically through the various operations of filling, capping, labeling, and the like, the articles must be established in stable handling position on the moving platform that carries them through any such operation. Although the flatness of the bottom surface of these articles can be designed for maximum stability of the articles in the upright position, the use of articles having a horizontally oblong cross-section, whether rectangular or curved, imposes an inherently unstable condition upon the carrying of rows of such articles because of their tendency, particularly when composed of light-weight material such as plastic, to topple in the direction of their smaller horizontal dimension. The resulting domino effect, with its excessive manual handling required to right the toppled articles, has dictated that the articles be carried by moving platforms in the direction of their larger horizontal dimension for maximum stability.

In feeding such articles onto a conveyor line carrying the articles in a direction along their larger horizontal dimension, the articles are generally supplied in the form of a plurality of rows of the articles in a supporting structure called a corrugate. The array of articles in the corrugate is virtually undisturbed when the corrugate is removed so as to leave the array of articles on a moving feed platform. The array of articles on the platform, thus arranged upright in a plurality of rows with the articles in each row aligned in the direction of their larger horizontal dimension, must then be transferred to a primary carrier on which the articles are arranged in a single row again aligned in the direction of their larger horizontal dimension, and this transfer must be capable of being made even when the size of the articles, and hence its horizontal dimension, is changed. Consolidation of a plurality of rows of articles into a single row of articles requires control of their feed onto the primary carrier, and this result is conventionally achieved by arranging the direction of movement of the feed carrier platform perpendicular to that of the primary moving carrier.

We have now devised an adjustable guide assembly for horizontally transferring a plurality of rows of upright articles of oblong horizontal dimensions from one moving platform to an adjacent second platform moving substantially perpendicular to the direction of the first-mentioned platform. The adjustable guide assembly of the present invention comprises a) row receiving means adapted to receive a plurality of rows of articles carried by the first-mentioned platform in a direction along the larger horizontal dimension of the article, b) row separating means adapted to separate the moving rows of articles in a direction along the smaller horizontal dimension of the articles, c) row turning means adapted to turn the separated rows of articles uniformly approximately 45° in a horizontal plane so as to discharge the articles in the thus-turned direction onto the second-mentioned moving platform, d) support means for supporting the guide above the first-mentioned moving platform, and e) adjusting means adapted to move the support means horizontally to effect uniform horizontal movement of the receiving means, separating means and turning means to accomodate a change in the samller horizontal dimention of the articles in said rows.

These and other novel features of the invention will be more readily understood from the following description taken in conjunction with the accompanying drawings in which FIG. 1 is a plan view of the adjustable guide assembly of the invention positioned above a feed conveyor for guiding rows of upright oblong articles onto an adjacent primary conveyor;

Figure 1:
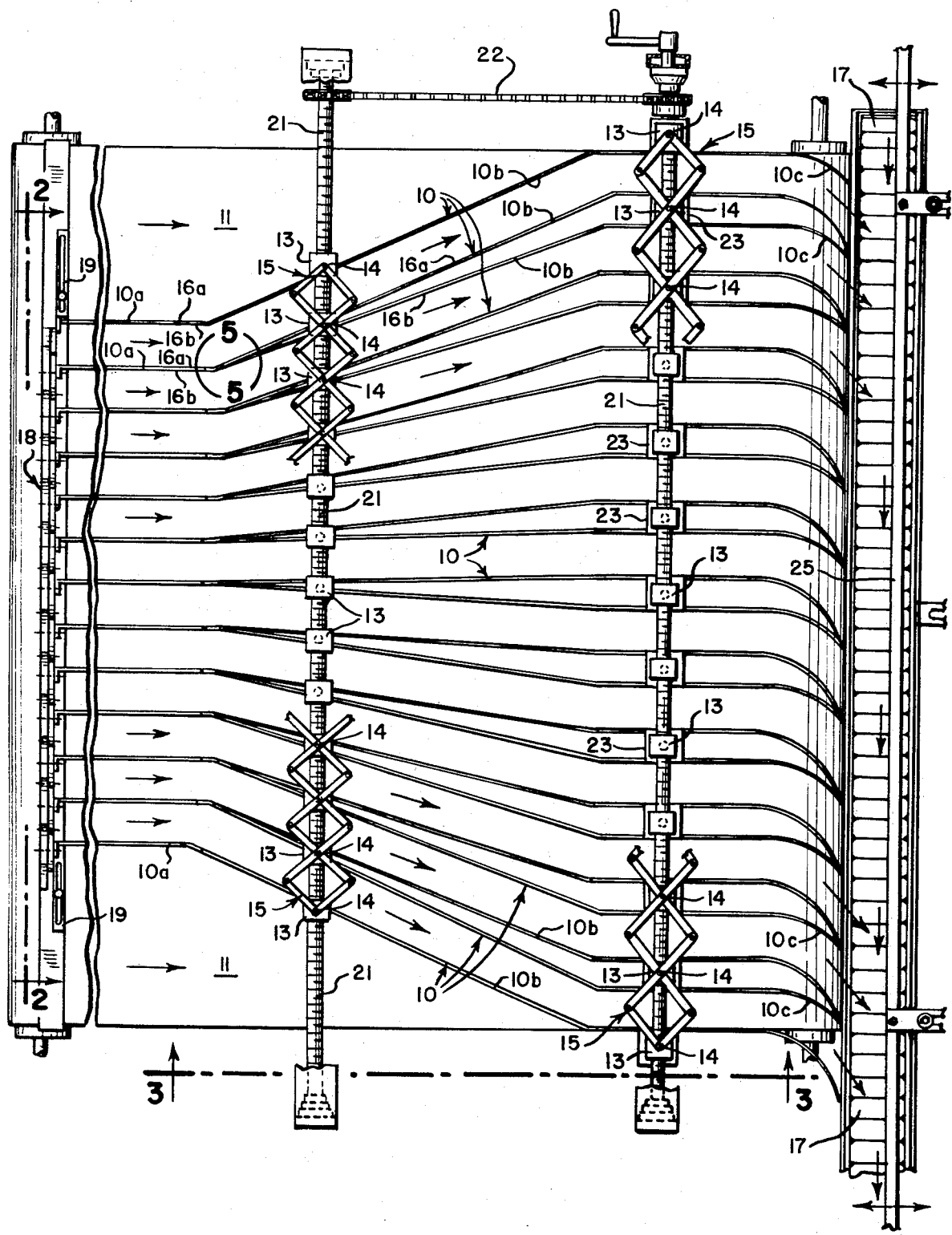
Figure 2:
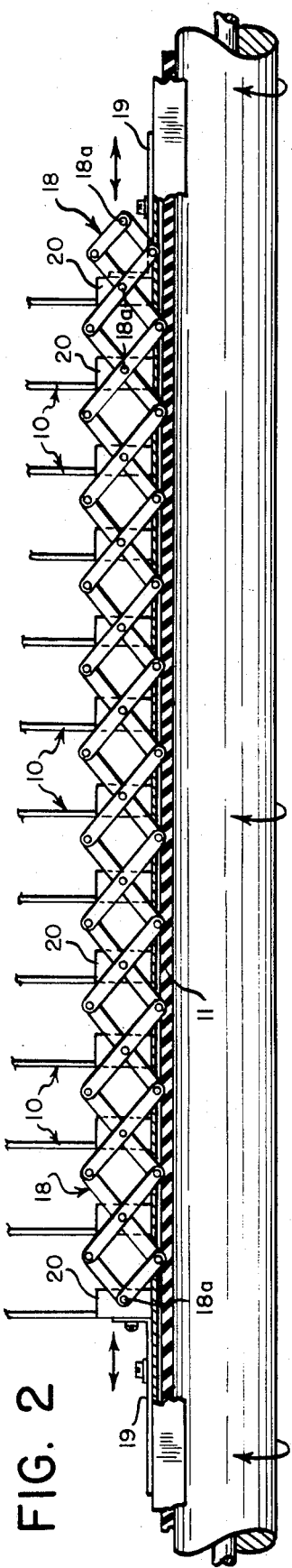
FIG. 2 is a front elevation of the adjustable guide assembly taken along the line 2—2 in FIG. 1.
Figure 3:
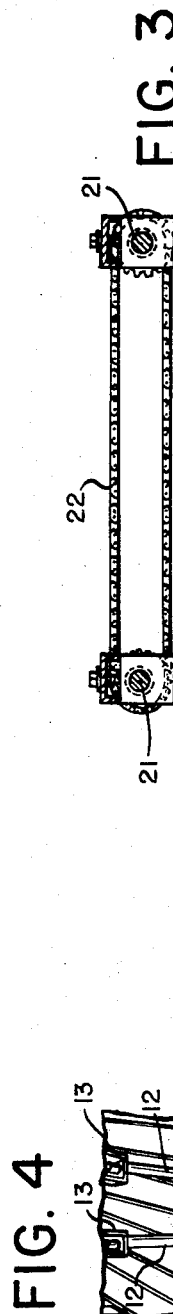
FIG. 3 is a side elevation of the adjustable guide assembly taken along line 3—3 in FIG. 1.
Figure 4:
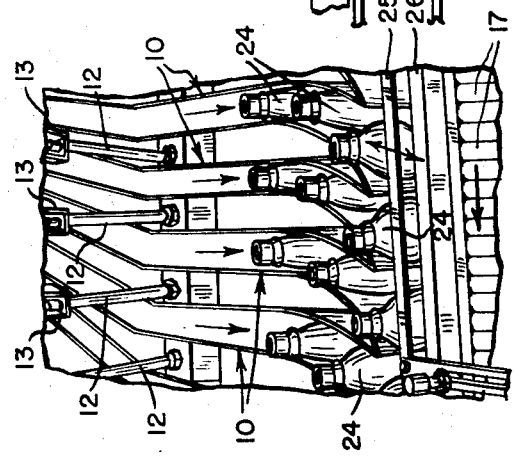
FIG. 4 is a partial perspective view looking down on the top of the guide assembly of FIG. 1 and showing the path of movement of the rows of articles.
Figure 5:
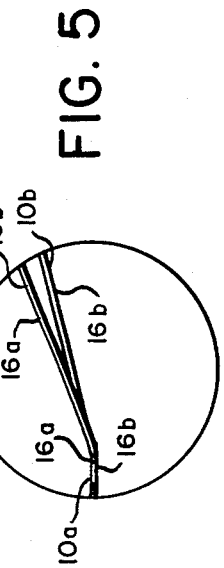
FIG. 5 is an enlarged detail plan view of structure within the circle 5—5 in FIG. 1.

The adjustable guide assembly comprises, as shown in FIGS. 1 and 3, a plurality of guide members 10 suspended above a moving feed platform, such as an endless belt 11, by supporting rods 12 depending from bushings 13 secured to the pivot points 14 of each of two horizontally spaced conventional panotgraphs 15. Each guide member 10 has a substantially straight feed-receiving end portion 10a aligned with the direction of movement of the belt 11, an intermediate row-separating portion 10b, and a curved discharge end portion 10c. Each guide member 10 is advantageously but not necessarily formed of sheet material such as metal so as to present to the rows of articles moving on the belt 11 two exterior guide surfaces 16a and 16b (FIG. 5). The same guide surfaces are provided when the guide members are solid rather than being formed of sheet material. The guides 10 are so positioned with respect to one another that the respective facing guide surfaces 16a and 16b of any pair of proximal guide members define a guide channel of uniform axial width from the receiving end to the discharge end of the cooperating guide surface. The width of the channel is slightly in excess of the smaller horizontal dimension of an upright article being handled.

Each channel-forming guide member 10, excepting the endmost members of the assembly, has its guide surfaces 16a and 16b closely positioned along its straight receiving end portion 10a, has its guide surfaces diverging from such close position along its row-separating portion 10b, and has its guide surfaces again converging progressively to a closed position along its curved discharge end portion 10c. Such an arrangement of guide surfaces can be obtained readily, as shown for example in FIG. 1, by forming each of said guides from a single strip of sheet metal folded transversely to define the extreme end of the curved discharge portion 10c of the guide and extending back to the junction of the straight row-receiving end portion 10a and the adjoining row-separating portion 10b, as shown in detail in FIG. 5. The folded back portion of the strip can be joined to the main body of the strip at said junction by soldering, welding, plastic bonding, or the like.

The only significant difference in the shape of the individual guide members of the full assembly resides in the angle of divergence of their central row-separating portions 10b. For example, in the center of the assembly of guide members shown in FIG. 1, the proximal guide surfaces 16a and 16b of the row-separating portions 10b of the two adjacent guide members are virtually aligned with their respective receiving end surfaces, whereas the respective distal guide surfaces 16b and 16a of these adjacent row-separating guide member portions diverge at a significant angle from their respective receiving-end portion surfaces. A corresponding progressive divergence is incorporated in the guide surfaces of the row-separating portion of each pair of successive adjacent guide members with the result that the guide surfaces define uniformly wide guide rows for the articles with each adjacent row provided with an increasing amount of divergence to effect uniform separation of each row, at the point of maximum seperation, at least equal to the larger horizontal dimension of the upright oblong articles. The articles thus become sufficiently separated from one another by the time they are discharged onto and are carried away by the primary moving platform, such as a conventional endless conveyor 17, that the articles of each row discharged from the feed belt transversely alternate with one another on the primary conveyor in narrow edge-to-narrow edge abutment.

The channel-forming guide members 10 do not require any change of shape to accomodate articles over a substantial range of variations in the smaller of their horizontal dimensions. The only change which need be made in the guide assembly, when changing the feed to a different size bottle within a reasonable range, is to change the width of each guide row by moving the guide members toward or away from one another. To do this, the guide members are supported conventionally on the overhead pantographs 15 and by an endmost pantographs 18. The pantographs 18 is mounted on slide plates 19 which can be moved individually or simultaneously to alter the position and the spacing, respectively, of the receiving end portions 10a of the guide members which are secured to the pivot points 18a of the pantographs by L-shaped brackets 20. The pantographs 15, however, are mounted to expand or contract on fixed supporting threaded rods 21 interconnected by a drive chain 22 so that both pantographs 15 expand or contract equally. The pantographs 15 can be located at any convenient position for supporting the guide members, although we have found it advantageous to position one pantograph 15 so that its depending guide member supporting rods 12 can be secured to the guide members in the space between the joined portions of the guide member near the junction of their straight receiving end portions 10a and their row-separating portions 10b. The other pantograph 15 is advantageously located above the row-separating portion 10b of the guide members with each of its depending guide member supporting rods 12 secured to a mounting bracket 23 which also serves as a spacer for the two folded-over sections of the guide member that define the row-separating portion 10b of each guide member. Thus, the two pantographs 15 can be operated to control the guide channel-forming spacing between the concentric row-separating and row-turning portions of the guide members 10. The pantograph 18 can be adjusted not only to provide the same spacing between the receiving end portions of the guide members but further to align these end portions with the guide portions supported by the other two pantographs 15 so that the receiving end portions of the guide channels are aligned with the direction of movement of the feed belt 11.

As mentioned previously, the shape of the guide members remains unchanged as their spacing is changed to accommodate bottles of different smaller horizontal oblong dimensions. In FIG. 1, for example, it will be noted that the spacing between any pair of channel-defining guide surfaces remains uniform perpendicular to the axis of the channel throughout the length of the channel defined by the guide surface portions 16a and 16b of guide portions 10a, 10b and 10c. However, because of the difference in curvature of the channel-defining guide surfaces of guide portion 10c, the spacing between these surfaces decreases more slowly than throughout the remainder of the channel and causes a significant divergence of these surfaces by the time the guide surfaces have been moved toward one another to reduce the width of channel to one-half through all of guide portions 10a and 10b. When this divergence becomes sufficiently large with respect to the smaller horizontal dimension (that is, the width of the oblong articles moving through the channels aligned in the larger horizontal dimension) there is a tendency for the articles to overlap or "shingle" adjacent the discharge end of each channel. When this happens, it indicates the lower limit of articles size which can be handled by the guide assembly of that specific size and the feed of articles of this size or smaller will require another guide assembly of smaller proportions or the use of filler inserts to restore the desired curvature of one of the diverging pairs of guide surfaces of cooperating guide portions 10c.

The height of the guide members 10, that is the transverse width of the sheet material of which they are formed, need only be sufficient to provide upright support for the articles as they move in rows. It has been found advantageous in practice, however, to reduce the height of the guide members along the feed end of their receiving end portions 10a to the minimum supporting height so as to facilitate delivery of articles to this end of the guide assembly from an array of the articles supplied in a corrugate, or the like, and to increase the height of the guide members throughout the remainder of their length to provide maximum insurance of support for the articles.

Discharge of the articles, such as the bottles 24, at an angle of 45° to the directions of travel of both the feed belt 11 and the primary carrier 17 is a particularly advantageous feature of the guide assembly of the invention. Although this angle can be decreased to as little as about 30° and can be increased to about 50° without significantly interfering with proper guidance of the bottles, it has been found that when the discharge angle of the guide channels is limited to about 45° over the end of the feed belt adjacent the carrier belt the moments of force imparted to the bottles at the discharge ends of the channels continue to advance the bottles toward the primary carrier 17 without causing the bottles to jam against the extreme curved discharge ends of the guide members. At the same time, this controlled angularity of the entry of the oblong-shaped bottles onto the primary carrier 17, together with the separation of bottles discharged from the ends of adjacent guide channels, facilitates the insertion of each bottle into its proper position in the desired edge-to-edge final alignment of the bottles on the primary carrier. This final alignment can be further promoted by a horizontally oscillating bar 25 which pulsatingly taps the shoulders of the partially turned bottles 24 as they move forward on the primary carrier 17 and as they are pushed laterally by the feed belt 11 against a support bar 26 aligned with the side of the primary carrier 17 distal with respect to the feed belt.

It will be appreciated, accordingly, that the guide assembly of the present invention is readily adapted for installation on existing conventional feed and carrier equipment and that this guide assembly makes it possible to receive pre-assembled arrays of articles such as plastic oblong bottles arranged in a plurality of rows and to feed them in their most stable arrangement into a similarly stable arrangement in a single row on a conventional moving carrier platform.

We claim:

1. An adjustable guide assembly for horizontally transferring a plurality of rows of upright articles of oblong horizontal dimensions from one moving platform to an adjacent second platform moving substantially perpendicular to the direction of the first-mentioned platform, the guide assembly comprising a) row receiving means adapted to receive a plurality of rows of articles carried by the first-mentioned platform in a direction along the larger horizontal dimension of the article, b) row separating means adapted to separate the moving rows of articles in a direction along the smaller horizontal dimension of the articles, c) row turning means adapted to turn the separated rows of articles uniformly approximately 45 degrees in a horizontal plane so as to discharge the articles in the thus-turned direction onto the second-mentioned moving platform, d) support means for supporting the guide above the first-mentioned moving platform, and e) adjusting means adapted to move the support means horizontally to effect uniform horizontal movement of the receiving means, separating means and turning means to accommodate a change in the smaller horizontal dimension of the articles in said rows.

2. A guide assembly according to claim 1 in which the guide members are supported above the first-mentioned moving platform by a plurality of pantographs.

3. An adjustable guide assembly for horizontally transferring a plurality of rows of upright articles of oblong horizontal dimensions from one moving platform to an adjacent second platform moving substantially perpendicular to the direction of the first platform, the guide assembly comprising a plurality of guide members adapted to be suspended above the first-mentioned moving platform, each guide member having one substantially straight feed end portion and one curved discharge end portion, each guide member having guide surfaces uniformly spaced from the proximal guide surfaces of adjacent guide members so as to define guide channels of uniform width slightly in excess of the smaller horizontal dimension of the articles, the guide channels of the straight feed end portion of each member being closely positioned and the guide channels of the curved discharge end portion diverging from said close positioning to a maximum divergent position progressively along the curved end portion of the guide member, the spacing between the articles at their maximum divergent position being slightly in excess of the larger horizontal dimension of the articles, and means for supporting the guide members above the first-mentioned moving platform in the aforesaid position to define said guide channels.

4. A guide assembly according to claim 3 in which the curved discharge end portions of the guide members are disposed at an angle of about 45 degrees to the straight feed end portions thereof.

* * * * *